Jan. 16, 1934.  W. A. MUDGE ET AL  1,943,619
METHOD AND APPARATUS FOR TESTING MATERIALS
Filed Jan. 10, 1927
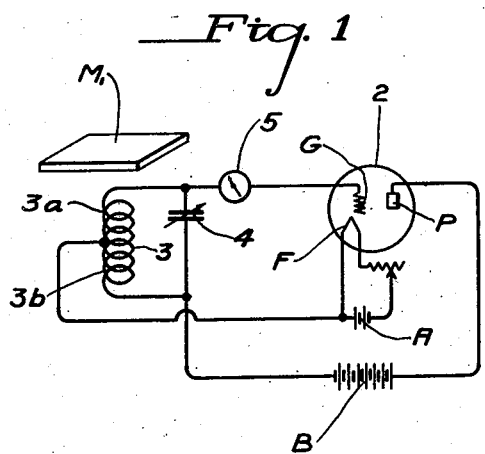
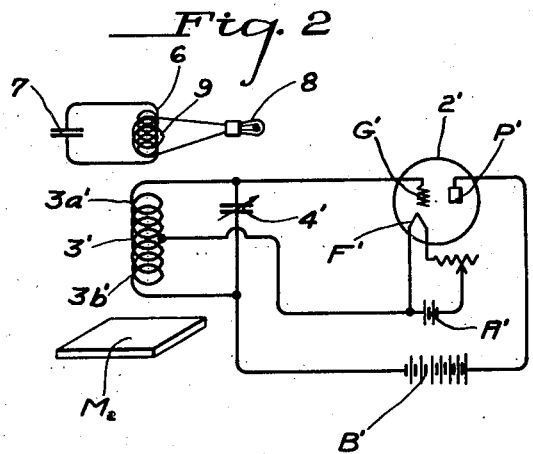
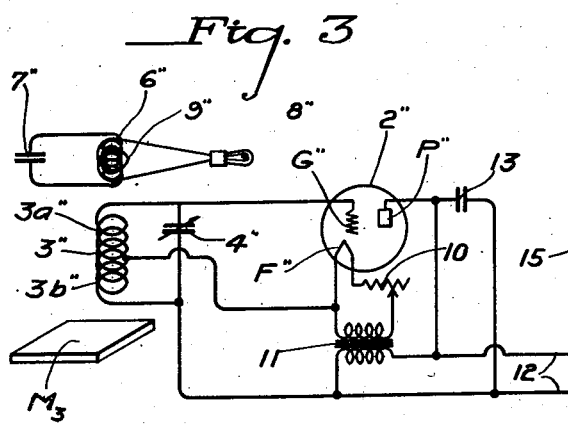
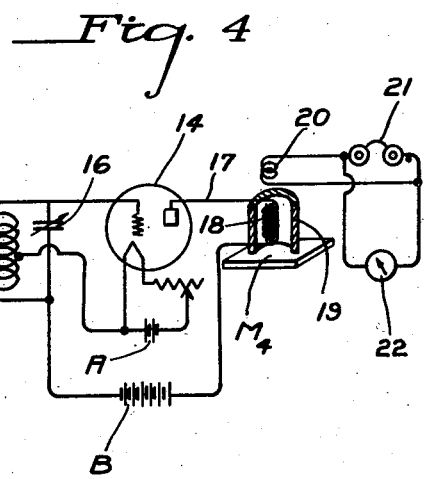
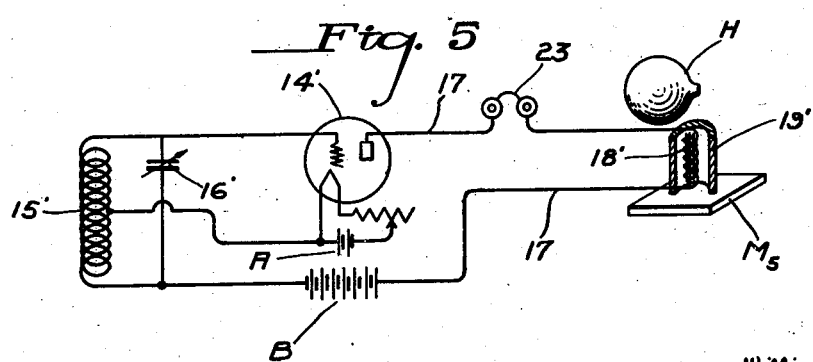
INVENTORS Patented Jan. 16, 1934

1,943,619

UNITED STATES PATENT OFFICE 1,943,619

METHOD AND APPARATUS FOR TESTING MATERIALS

William Alvin Mudge and Clarence George Bieber, Huntington, W. Va.

Application January 10, 1927. Serial No. 160,287

3 Claims. (Cl. 175—183)

Our invention relates to testing of materials, and more particularly to a method and apparatus for testing materials with regard to one or more inherent characteristics, such, for example, as hardness or soundness; or with regard to what may be termed an acquired or artificial characteristic, which is the result of outside influence, such for example, as temperature.

According to our invention, materials may be tested by establishing an oscillating field, as by a varying electric current, bringing the material to be tested into the field, and ascertaining the reaction of one upon the other. The reaction may be determined by suitable indicating or translating devices, according to the conditions under which the test is conducted, for example, temperature data may be noted by means of a visual indicator, as milliammeter readings, or the flashing of a light. Similarly, hardness or composition data may be translated into audible vibrations and variations in such characteristics may be noted as variations in the readings, or in the tone or pitch of the sound produced by the audible vibrations.

It will be understood, however, that no particular indicator or translating device is necessarily associated with the determination of any one particular characteristic of the material, the audible and visual indicators may be used more or less interchangeably, and the above illustrations are by way of example only.

While we will describe our invention as specifically applied to the testing of metals, it is not so limited; the material to be tested may be non-metallic or dielectric, animate or inanimate, as desired. The indicating or translating means whereby the characteristics of the material being tested are made known may be varied in nature to suit the particular conditions under which the test is being conducted and according to the nature of the material being tested.

As above stated, our invention comprehends determining the reaction between a material to be tested and an oscillating field; the oscillating field may be varied by the introduction of the material into the field, or the material may be vibrated by corresponding oscillations set up therein by the oscillating field. Either of these methods may be applied to the testing of one or more of the natural characteristics of the material, or to the testing of an acquired or artificial characteristic, such as temperature.

In our present preferred form, we employ a field oscillating at super-audible frequency, since this leads to simplification of the apparatus and permits very accurate measurement. In such case, one or more properties of the material to be tested may be determined by noting the effect of the material upon the oscillating field.

In the accompanying drawing illustrating certain preferred embodiments of our invention:

Figure 1 is a circuit diagram of the preferred apparatus using a milliammeter as an indicator;

Figure 2 is a diagram similar to Figure 1, but showing a flashing lamp indicator;

Figure 3 illustrates a circuit similar to that illustrated in Figure 2, but employing alternating current as a source of power for the electron emission device;

Figure 4 diagrammatically illustrates the apparatus preferred for vibrating materials audibly; and Figure 5 illustrates apparatus similar to that shown in Figure 4.

Referring to the illustrated embodiment (Figure 1) there is shown a variable oscillator capable of producing a periodically varying field having a wide range of frequencies selectively obtainable as desired. The oscillator preferably comprises an electron emission device, such as a thermionic valve 2, and a resonant circuit comprising an oscillation transformer 3 and a variable condenser 4. The transformer 3 has two mutually inductive windings $3a$ and $3b$ connected to the grid $g$ and plate $p$ respectively of the valve 2, the windings being connected at the center and returned to the filament $f$, as is well understood in the art. The transformer 3 and condenser 4 form an oscillator circuit capable of adjustment to resonance throughout a wide range of frequencies by adjustment of the variable condenser 4. The condenser 4 may be set to tune the circuit to resonance at any desired frequency and thus provides a "zero" adjustment to suit the conditions of the test. Suitable batteries $a$ and $b$ provide current for the filament and potential for the plate $p$ respectively in the usual manner. Connected in the grid circuit, between the oscillation transformer and the grid $g$ is a milliammeter 5, adapted to indicate variations in the grid current.

In using the above apparatus, a piece of material $M_1$ to be tested is brought into the oscillating field of the transformer 3 and the reaction between the material and the oscillating field of the transformer determined directly by a milliammeter 5 which will indicate any fluctuations occurring in the grid current. When the material to be tested is brought into the balanced oscillating field of the transformer the alternating current resistance of the circuit is increased, the greater increase being in that coil, 3a or 3b, which is nearer to the material to be tested. This increased resistance in the circuit causes a drop in the milliammeter reading. These different milliammeter readings are therefore direct indications of the properties of the material, since materials having different properties will increase the resistance of the circuit by different amounts.

In Figure 2 there is shown an oscillator similar to that illustrated in Figure 1, and similar parts are designated by the corresponding reference characters having a prime affixed thereto. The oscillator comprises an electron emission device 2' connected to an oscillation transformer 3', which is tuned by a variable condenser 4'. Disposed in inductive relationship with the oscillation transformer 3' is a coil 6 shunted by a fixed condenser 7, the coil and condenser comprising a resonant circuit tuned to a definite frequency. An electric lamp 8, serving as an indicator, has its terminals connected to a loop 9 disposed adjacent the coil 6. As is well understood in this art, the maximum current flows when the circuit is tuned to resonance, so by choosing a lamp 8 of the proper characteristics, and suitably proportioning the turns ratio between the loop 9 and the coil 6, the lamp may be caused to light only when maximum current is flowing in the resonant circuit comprising the coil 6 and condenser 7. In this way, the flashing of the lamp 8 serves to indicate a resonant condition in the coil 6 and condenser 7. The operation of the device is somewhat similar to that of the device previously illustrated, a piece of material $M_2$ to be tested is brought into the oscillating field of the transformer 3', and the variable condenser 4' is suitably adjusted until a condition of resonance is established between the oscillation transformer 3' and the coil 6, at which time the lamp 8 will flash. By noting the readings of the condenser 4' which are obtained at the time the lamp 8 ceases to burn, a very accurate determination of the effect of the material $M_2$ upon the oscillating field of the coil 3' may be obtained. The adjustment of the condenser 4' required to bring the oscillation transformer into resonance with the coil 6 and condenser 7 may be used as an arbitrary standard of comparison between materials of different composition or of different inherent nature, or between materials of the same nature tested at different temperatures. Inasmuch as the circuit may be so constructed that the lamp 8 requires the maximum current to flow in the coil 6 before the lamp flashes, the device is capable of great refinement and accurate adjustment.

A practical use of the described devices would be, for example, the testing of metals during a rolling process. The transformer 3' could be placed in fixed relation to the moving strip of metal and the condenser 4' adjusted so that the lamp 8 would burn continuously as long as the metal passing beneath the coil has the desired composition and physical characteristics. If the metal should vary in composition or hardness, for instance, the lamp 8 would immediately go out, thereby indicating to the operator that he strip being rolled does not have the desired qualities.

Similarly the invention may be used to determine the temperature of hot rolls while the rolling operation is progressing. Great difficulty has been experienced in maintaining hot rolls at the proper temperature so that the rolls are not too cold for proper rolling, and are not so hot that their strength is materially impaired. By our invention, it is possible to place a coil similar to the oscillation transformer 3' adjacent to the rolls and determine the temperature even though the mill be in operation. Obviously, any suitable indicating device, such as a flashing lamp or a milliammeter may be utilized to show material changes in the temperature.

In Figure 3 there is shown a test apparatus comprising an electron emission device similar to that shown in Figure 2, with the exception that the filament current for the valve is supplied directly from a transformer and a potential for the plate circuit is secured directly from a high voltage line. This arrangement permits the use of a test device, without the use of batteries, directly from the ordinary alternating current source usually available. The apparatus preferably comprises a thermionic valve 2" having a filament $f''$ connected through a rheostat 10 to the secondary coil of a suitable transformer 11. The primary of the transformer 11 may be connected directly to the alternating current source through leads 12. The plate $p''$ of the thermionic valve may be connected directly to one of the leads 12. A bypass condenser 13 is preferably provided, across the leads 12, as is well understood in the art. The oscillation transformer 3" has one end thereof connected to the grid 9" with a valve 2", the center tap thereof returns to the filament $f''$, and the other end thereof is connected to the alternating current source.

The operation of the device last described is the same as the operation of the devices previously described; a piece of material to be tested $M_3$ is brought adjacent the oscillation transformer 3" and a variable condenser 4" is adjusted until the circuit is brought into resonance with a coil 6" and condenser 7", whereupon a lamp 8" lights.

All of the devices hereinbefore described operate at super-audible frequencies and the indicator, a flashing lamp or a delicate meter, permits the operation of the device by unskilled persons. The devices hereinafter described operate at audible frequencies and these, which necessitate the operator to distinguish between the pitches and variations in tone, are obviously not so well suited to use in noisy places, such as a rolling mill, or places wherein only unskilled operators are available.

The device illustrated in Figure 4 comprises a variable oscillator, capable of producing a periodically varying field within the range of the audible frequencies. The oscillator comprises a thermionic valve 14, and an oscillation transformer 15, shunted by a variable condenser 16. The plate circuit 17 of the valve 14 includes a magnetic coil 18 adapted to set up the varying field into which the material to be tested is brought. The coil 18 is preferably disposed within a shielding casing which effectually confines the field to a definite area of the material $M_4$ to be tested. The coil 18 being fixed within the casing 19 is held in fixed relationship with the material $M_4$ when the casing 19 is placed upon the material. Inductively coupled with the coil 18 is a pickup coil 20 which is connected to a suitable translating device, such as receivers 21 or a sensitive meter 22.

When operating the device illustrated in Figure 4 the casing 19 is placed upon the material to be tested, the oscillator is then adjusted by means of the variable condenser 16 to bring the oscillating circuit into resonance with the natural frequency of free vibration of the material M₄ to be tested. When the circuit is in resonance with the material being tested, maximum current flows through the coil 18, and there is a maximum transfer of energy to the translating devices.

Inasmuch as the frequency of free vibration of the material to be tested depends not only upon the composition of the material but also upon the area of the material being vibrated, it is important that the holder 19 be the same for various test pieces so that the same area is exposed to the oscillating field in making comparative tests.

Inasmuch as it is undesirable to have the customary alternating current hum in test apparatus depending upon the quality and pitch of tone produced, we prefer to use batteries in the devices which operate at audible frequency, although it will be understood that alternating current may be used as a source if suitable filter and ironing circuits are employed.

In Figure 5, we have illustrated an apparatus similar to that shown in Figure 4, but which works at audible frequencies similar in principle to those shown in Figures 2 and 3, with the exception that no pickup coil 20 is employed. Parts corresponding to those illustrated in Figure 4 will be designated by like numerals having a prime affixed thereto.

In this embodiment the translating device, such as headphones 23, is included in the plate circuit in series with the transfer coil 18' so that variations in the plate current are registered directly without the intermediate coupling between a pickup coil and the coil 18. In operating this device, the casing 19 is placed upon a piece of material M₅ to be tested and the circuit is tuned by adjusting the variable condenser 16' until a resonance (translated into sound by the headphones 23) is established between the oscillating field and the natural frequency of the Helmholtz resonator H.

Similarly to the device illustrated in Figure 4, this embodiment employs a casing 19' which exposes a definite area of the test piece to the oscillating field established by the coil 18'. A condition of resonance may be established between the oscillating field and the natural frequency of vibration of the Helmholtz resonator. This is registered as an increase in the sound produced in the resonator. Variations in the composition of material to be tested, as well as variations in the temperature thereof, may be noted as variations in the quality of the tone produced and in the pitch of the tone.

The device as illustrated in Figures 4 and 5 is well adapted for laboratory testing where skilled operators may be employed and slight variations in tone and pitch may be easily distinguished. These devices are also adapted, however, for testing sheets of metal for uniformity of composition and hardness. If a sensitive meter is used to indicate the resonant frequency, the devices operating within the audible frequencies may be used in noisy places as well as the flashing lamp indicating devices previously described.

The devices illustrated in Figures 1 to 3, inclusive operating at super-audible frequencies have been found to give highly satisfactory results in practise, due to the high degree of accuracy which they permit and to the accurate indicating devices which may be employed in such circuits. For example, coil 6 or 6'' and condenser 7 or 7'' constitute what is in effect a wave meter which is tuned very sharply to a particular frequency, making a very accurate standard upon which to base laboratory measurements. If desired, other resonant control devices, such as quartz crystals, may be employed to insure a fixed resonating circuit for comparison. It will be understood, of course, that the oscillation transformer may be the fixed standard of comparison in these testing devices and what has been designated as a wave meter may constitute the variable elements. The coupling between the wave meter and the oscillation transformer being fixed, it will be apparent that the variable control element may be embodied in either unit within the spirit of the invention.

If it is desired to compare metallic sheets with a certain standard, the devices operating within the audible range may be employed in conjunction with a Helmholtz resonator, as indicated by H in Figure 5. Inasmuch as the test piece is held in predetermined relationship with the coil 18, and the casing 19 confines the oscillating field to a definite area of the test piece, the variable elements reside wholly within the test piece and the variable condenser 16'. It is obvious then that variations in the material are readily ascertained in the setting of the condenser 16' from the setting normally required to bring the circuit into resonance with a standard test piece, at which setting the standard test piece is in resonance with the resonator. The resonator then gives a standard of comparison for the tone produced by materials of varying composition or materials at various temperatures. It will be understood that the test piece is intentionally vibrated mechanically at audible frequencies in Figure 4, the mechanical vibration of the piece during super-audible testing and in audible testing in Figure 5, being merely incidental.

In determining temperatures, it may be well to permit a standard test piece to remain adjacent the oscillating circuit, and measure the temperature purely by radiation to the test piece. This latter arrangement permits very close determination of temperature far below that of an optical or radiation pyrometer and within the range of a thermocouple. The method outlined is particularly useful in determining the temperatures of large masses of metal at temperatures which would have a deleterious effect upon the insulation of the coils employed.

Although the pickup coils of the indicating devices have been illustrated as being closely coupled to the oscillation transformers in all cases, it will be understood that the wave meter coils or indicator pickup coils may be disposed on the side of the test piece opposite to that on which the oscillation transformer is placed. The latter method is particularly adapted for the testing of dielectric materials or large objects having a low capacity for absorption from the oscillating field. It will be understood of course, that large objects having a high absorptive capacity may be so tested if the strength of the field is commensurate with the object to be tested.

The effect measured by the super-audible frequency apparatus is that produced in an oscillating circuit by the combination of mechanical, magnetic, chemical and electric or dielectric properties. By suitably designing the apparatus and choosing an appropriate frequency, we may separately measure the effect produced by any one of the properties. The apparatus in Figure 4 operating within the audible range vibrates the sample directly and audibly, the transfer coil 18 serving in the nature of an electromagnet.

Changes in temperature or measurements of temperature may be demonstrated or measured with either type of apparatus, as desired.

Thus we provide an improved method and apparatus for testing materials by aid of an oscillating field and resonant frequencies. We further provide an improved method and apparatus for determining the properties of materials and measuring the temperatures thereof, whereby the material tested is not limited to a small test piece but may comprise a large mass to which the test is momentarily applied. Our invention further comprehends the continuous testing of material which is passing adjacent to the test device, such test being adapted to register changes in composition, uniformity of physical characteristics or temperature.

Further advantages accrue to our invention by the provision of a simple method and apparatus for determining various properties of materials by freely vibrating the material and comparing the quality of the tone and the pitch of the sound produced with a standard of comparison.

Although we have illustrated an oscillator as being dependent upon an electron emission device, it will be understood that the invention contemplates the use of an oscillating electric field, the means for producing the field is not limited to the apparatus illustrated, and various other means for establishing oscillating fields and resonant circuits may be employed without departing from the spirit of the invention. It will be observed that whether the test piece is mechanically vibrated by a magnetic field at audible frequencies, or a magnetic property is determined by bringing the test piece into a field oscillating at super-audible frequencies, the invention in either case contemplates the same idea of introducing the test piece into an oscillating field, determining a resulting reaction, and interpolating such reaction in terms of a natural or acquired characteristic of the material under test.

While we have illustrated and described certain preferred embodiments of our invention, it will be understood that it is not limited thereto, but that the invention may be otherwise practised and embodied within the scope of the following claims.

We claim:

1. The method of measuring the property of a magnetic material which comprises bringing an oscillating circuit to a condition approaching resonance, introducing a piece of the magnetic material to be tested into an electromagnetic field generated by said oscillating circuit to vary the tuning of said circuit, and detecting such variation in the tuning of said circuit.

2. The method of measuring the property of a magnetic material which comprises bringing an oscillating circuit to a condition approaching resonance at a radio frequency, introducing a piece of the magnetic material to be tested into an electromagnetic field generated by said oscillating circuit to vary the tuning of said circuit, and detecting such variation in the tuning of said circuit.

3. The method of determining a property of a magnetic material which comprises introducing the material into predetermined fixed relation to the field of a coil comprising part of a thermionic tube oscillator circuit and measuring the decrease in the amplitude of the oscillations in said circuit effected by the resulting hysteresis losses.

WILLIAM ALVIN MUDGE.
CLARENCE GEORGE BIEBER.